(12) United States Patent
Yopp

(10) Patent No.: US 9,360,865 B2
(45) Date of Patent: Jun. 7, 2016

(54) TRANSITIONING FROM AUTONOMOUS VEHICLE CONTROL TO DRIVER CONTROL

(71) Applicant: Ford Global Technologies, LLC, Dearborn, MI (US)

(72) Inventor: Wilford Trent Yopp, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 78 days.

(21) Appl. No.: 14/032,289

(22) Filed: Sep. 20, 2013

(65) Prior Publication Data

US 2015/0088357 A1 Mar. 26, 2015

(51) Int. Cl.
*B62D 1/04* (2006.01)
*G05D 1/00* (2006.01)
*B60W 30/00* (2006.01)

(52) U.S. Cl.
CPC .............. *G05D 1/0061* (2013.01); *B60W 30/00* (2013.01); *B62D 1/04* (2013.01); *G05D 1/00* (2013.01); *G05D 2201/0212* (2013.01); *G05D 2201/0213* (2013.01)

(58) Field of Classification Search
USPC ....................................................... 701/29.2
See application file for complete search history.

(56) References Cited

U.S. PATENT DOCUMENTS

| | | | |
|---|---|---|---|
| 5,691,693 A * | 11/1997 | Kithil | 340/439 |
| 6,014,595 A * | 1/2000 | Kobayashi | 701/1 |
| 7,424,414 B2 | 9/2008 | Craft | |
| 8,169,311 B1 * | 5/2012 | Breed | 340/438 |
| 8,352,112 B2 | 1/2013 | Mudalige | |
| 8,359,149 B2 | 1/2013 | Shin | |
| 8,860,564 B2 * | 10/2014 | Rubin et al. | 340/436 |
| 2008/0046149 A1 * | 2/2008 | Breed | 701/45 |
| 2008/0157510 A1 * | 7/2008 | Breed et al. | 280/735 |
| 2008/0161989 A1 * | 7/2008 | Breed | 701/29 |
| 2008/0216567 A1 * | 9/2008 | Breed | 73/146.5 |
| 2009/0046538 A1 * | 2/2009 | Breed et al. | 367/93 |
| 2010/0268423 A1 * | 10/2010 | Breed | 701/45 |
| 2010/0316255 A1 | 12/2010 | Mathony et al. | |
| 2012/0083960 A1 | 4/2012 | Zhu et al. | |
| 2012/0089299 A1 * | 4/2012 | Breed | 701/36 |
| 2012/0212353 A1 * | 8/2012 | Fung et al. | 340/905 |
| 2013/0179024 A1 * | 7/2013 | Nordbruch | 701/23 |
| 2014/0277896 A1 * | 9/2014 | Lathrop et al. | 701/23 |
| 2014/0371984 A1 * | 12/2014 | Fung et al. | 701/38 |

OTHER PUBLICATIONS

Kuchinskas, "Crash Course: Training the Brain of a Driverless Car", Scientific Americana, Apr. 11, 2013, http://www.scientificamerican.com/article.cfm?id=autonomous-driverless-car-brain.
Szondy, "University of Oxford Develops Low-Cost Self-Driving Car System", Feb. 18, 2013, http://www.gizmag.com/oxford-robot-car/26282/.

\* cited by examiner

*Primary Examiner* — Shelley Chen
(74) *Attorney, Agent, or Firm* — Frank A. MacKenzie; Bejin Bieneman PLC

(57) ABSTRACT

Data is obtained concerning at least one attribute of a vehicle operator. The attribute is used to determine an instruction for positioning a vehicle component during autonomous operation of the vehicle. Autonomous operation of the vehicle, including positioning the vehicle component according to the instruction, is performed.

18 Claims, 2 Drawing Sheets

TRANSITIONING FROM AUTONOMOUS VEHICLE CONTROL TO DRIVER CONTROL

BACKGROUND

A vehicle such as an automobile may be configured for autonomous driving operations. For example, the vehicle may include a central control unit or the like, i.e., the computing device having a processor and a memory, that receives data from various vehicle data collection devices such as sensors and generally also external data sources such as navigation information. The central control unit may then provide instructions to various vehicle components, e.g., actuators and the like that control steering, braking, acceleration, etc., to control vehicle operations without action, or with reduced action, by a human operator.

For example, autonomous vehicles can use by-wire systems, such as steering, brakes, accelerator and powertrain to control the movement of the vehicle when in the autonomous driving mode. When in a full autonomous driving mode, an Autonomous Vehicle Driving System (AVDS) can take full control of the steering, braking and accelerator using only electrical commands, e.g., from a central control unit or the like. Vehicle components such as the steering wheel, brake pedal and accelerator pedal are not necessary to vehicle operation, but may remain present. Further, a human operator may remain "in the driver's seat," i.e., proximate to vehicle components such as a steering wheel, accelerator, brake pedal, gearshift lever, etc., and may have an ability to exercise control over such components.

DRAWINGS

DETAILED DESCRIPTION

System Overview

Figure 1:
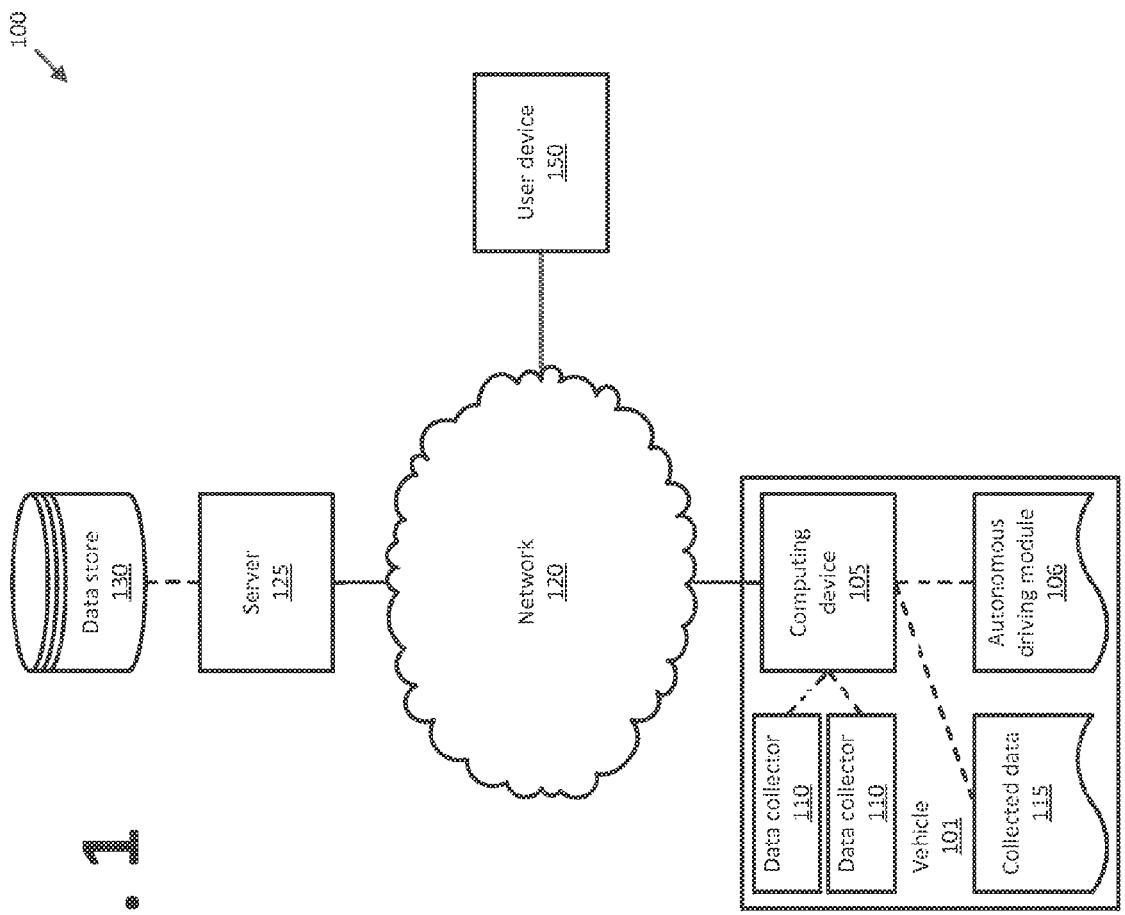
FIG. 1 is a block diagram of an exemplary autonomous vehicle system.

FIG. 1 is a block diagram of an exemplary autonomous vehicle system 100. A computer 105 may be configured for communicating with one or more remote sites such as a server 125 via a network 120, such remote site possibly including a data store 130. A vehicle 101 includes the vehicle computer 105 that is configured to receive information, e.g., collected data 115, from one or more data collectors 110 related to various components of the vehicle 101, e.g., a steering wheel, brake pedal, accelerator pedal, gearshift lever, etc. The computer 105 generally includes an autonomous driving module 106 that comprises instructions for autonomously, i.e., without operator input, operating the vehicle 101, including possibly in response to instructions received from a server 125. Further, the computer 105, e.g., in the module 106, generally includes instructions for receiving data, e.g., from one or more data collectors 110 and/or a human machine interface (HMI), such as an interactive voice response (IVR) system, a graphical user interface (GUI) including a touchscreen or the like, etc.

By determining driver characteristics and/or vehicle 101 operating conditions, the module 106 may determine an appropriate control or controls to be applied to one or more vehicle components. For example, the module 106 may determine whether and when a steering wheel should be moved to mimic or approximate vehicle 101 steering being conducted as part of an autonomous driving operation, e.g., autonomous driving according to instructions from the server 125 and/or the module 106.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. In addition, the computer 105 may be configured for communicating with the network 120, which, as described below, may include various wired and/or wireless networking technologies, e.g., cellular, Bluetooth, wired and/or wireless packet networks, etc.

Generally included in instructions stored in and executed by the computer 105 is an autonomous driving module 106. Using data received in the computer 105, e.g., from data collectors 110, the server 125, etc., the module 106 may control various vehicle 101 components and/or operations without a driver to operate the vehicle 101. For example, the module 106 may be used to regulate vehicle 101 speed, acceleration, deceleration, steering, operation of components such as lights, windshield wipers, etc. Further, the module 106 may include instructions for evaluating information received in the computer 105 relating to vehicle 101 operator characteristics, e.g., from an HMI and/or data collectors 110.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LADAR, sonar, etc. sensors that could be deployed to measure a distance between the vehicle 101 and other vehicles or objects. Yet other sensor data collectors 110 could include cameras, breathalyzers, motion detectors, etc., i.e., data collectors 110 to provide data for evaluating a condition or state of a vehicle 101 operator. In addition, data collectors 110 may include sensors to detect a position, change in position, rate of change in position, etc., of vehicle 101 components such as a steering wheel, brake pedal, accelerator, gearshift lever, etc.

A memory of the computer 105 generally stores collected data 115. Collected data 115 may include a variety of data collected in a vehicle 101. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by a collection device 110 and/or computed from such data. For example, collected data 115, as mentioned above, may include data concerning a position, change in position, rate of change in position, etc., of vehicle 101 components such as a steering wheel, brake pedal, accelerator, gearshift lever, etc.

The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115, as well as parameters for evaluating operator input, e.g., parameters for a specific vehicle 101 operator, a specific vehicle 101, particular weather or other environmental conditions, etc. further, the server 125 may store information related to multiple vehicles 101, traffic conditions, weather conditions, etc., within a geographic area, with respect to a particular road, city, etc. The server 125 could also be configured to provide drive-by-wire instructions to vehicles 101 in an autonomous driving area, e.g., a road, etc., such as an "all stop" instruction for all vehicles 101 to stop, a speed restriction, a lane restriction, etc.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 155 may use such communication capabilities to communicate via the network 120 and also directly with a vehicle computer 105, e.g., using Bluetooth. Accordingly, a user device 150 may be used to carry out operation herein ascribed to a data collector 110, e.g., voice recognition functions, cameras, etc., in a user device 150 could be used for an HMI to the computer 105, to provide information about a vehicle 101 operator, e.g., age, driving experience, etc.

Exemplary Process Flows

Figure 2:
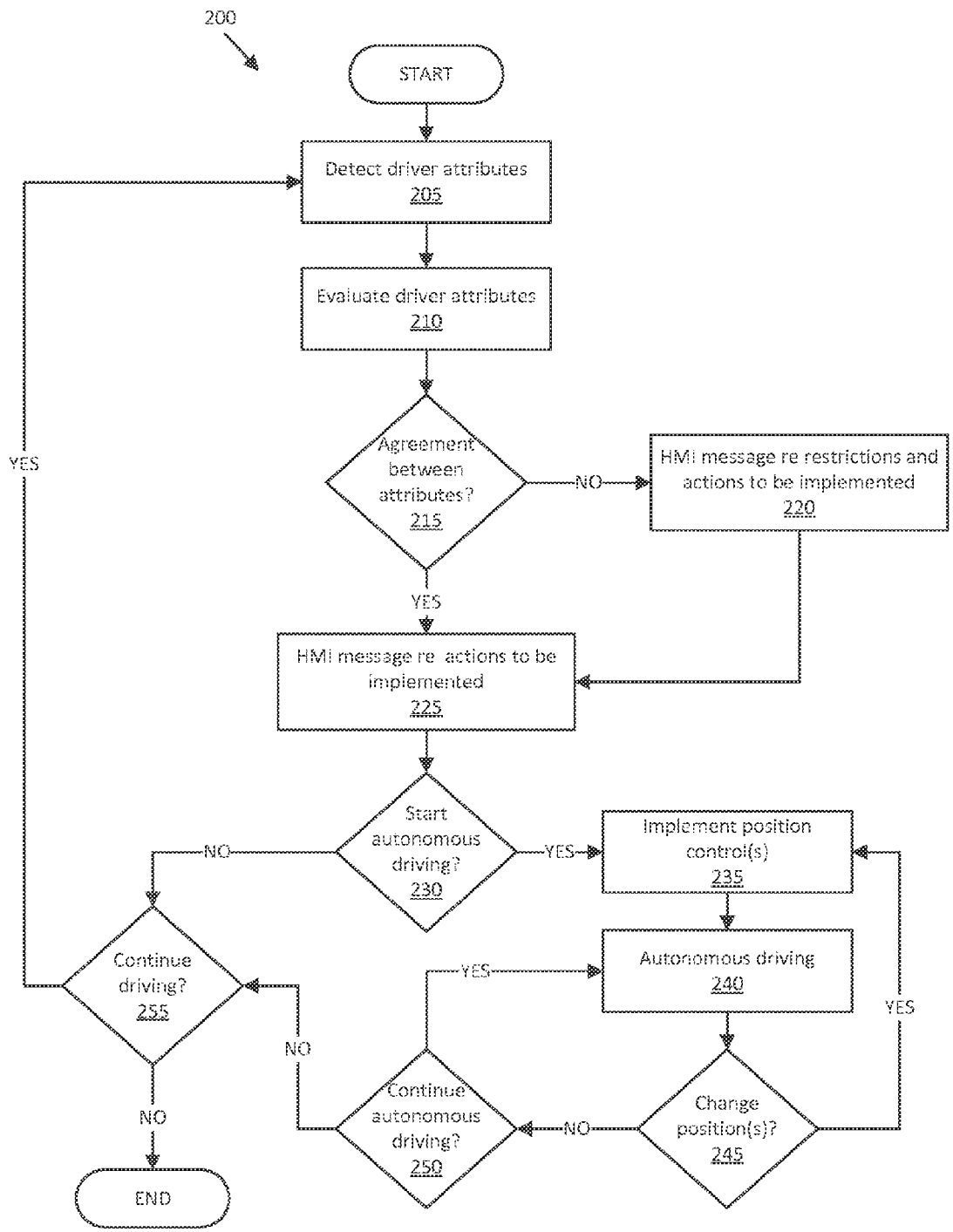
FIG. 2 is a diagram of an exemplary process for detecting driver characteristics and determine appropriate positioning control(s).

FIG. 2 is a diagram of an exemplary process 200 for detecting driver characteristics and determine appropriate positioning control(s).

The process 200 begins in a block 205, in which the computer 105 detects vehicle 101 operator (herein, and operator is sometimes referred to as a driver) attributes that may be relevant to determining positioning of vehicle 101 components appropriate to the operator. For example, an operator could provide an identifier via an HMI of the computer 105 or the device 150, or an operator identity could be determined according to data from a data collector 110, e.g., a camera, a voice recognition system, etc. Further, operator identifying information, e.g., a name or identifier provided via an HMI, an image captured by data collector 110, etc., could be submitted to the server 125 via the network 120, whereupon the server 125 could supply relevant operator attributes for positioning vehicle 101 components.

A variety of operator attributes may be relevant to determining appropriate positioning of vehicle 101 components for an operator. For example, a data collector 110 could capture an image used to identify an operator as mentioned above, but alternatively or additionally, such image could be used to estimate an age of a vehicle operator, e.g., using known image analysis techniques. Likewise, an HMI of the computer 105 could query a vehicle 101 operator for the operator's age, autonomous vehicle driving experience, and other factors. Further, operator attributes could be determined according to preferences specified by a vehicle 101 operator, e.g., in input via the HMI, with respect to movement of components of an autonomous vehicle 101. Alternatively or additionally, the computer 105 and/or the server 125 could store such information to be provided to the module 106 upon an identification of a vehicle 101 operator.

Further alternatively or additionally, the computer 105 and/or the server 125 could store instructions, e.g., an operator profile, for positioning vehicle components appropriate for a particular operator. For example, such instructions could indicate, for an operator, whether to move a steering wheel to mimic or approximate vehicle 101 steering, whether to move an accelerator pedal to mimic or approximate vehicle 101 throttling, whether to move a brake pedal to mimic or approximate vehicle 101 braking, whether to shift a vehicle gear, etc. Accordingly, an operator attribute or attributes could simply be one or more operator preferences concerning positioning a vehicle component or components during autonomous vehicle operation. Moreover, different attributes could apply to different components in the vehicle 101. For example, a driver preference could indicate that a steering wheel should move during autonomous driving, but an accelerator should not.

Following the block 205, next, in a block 210, the module 106 evaluates vehicle 101 operator attributes gathered as described above with respect to the block 210, e.g., data from a data collector 110, operator-indicated preferences, etc. In some cases, attributes for an operator might simply indicate a set of instructions for positioning vehicle 101 components during autonomous driving operations. For example, instructions could be associated with an experienced driver of an autonomous vehicle that no vehicle 101 components need be moved or repositioned during autonomous driving operations, e.g., a steering wheel will not move even when the vehicle 101 is being turned, a brake pedal will not move even when breaking operations are being carried out, etc. Further for example, instructions could be associated with an inexperienced driver of an autonomous vehicle that the vehicle 101 components are to be moved or repositioned during autonomous driving operations to mimic those operations, e.g., a steering wheel will turn to approximate vehicle 101 turning, a brake pedal will be depressed when breaking operations are being carried out, etc.

Next, in a block 215, the module 106 determines whether there is agreement between attributes evaluated in the block 210. For example, if the driver indicates a preference for vehicle 101 components to not change position at all during autonomous vehicle 101 operation, but the driver is also detected to be inexperienced with autonomous vehicle operations, then there may not be agreement between attributes. Similarly, an operator's age or other physical attributes could dictate that autonomous vehicle 101 components should change position even though a driver has indicated a preference, or other attributes indicate to the contrary. If there is not agreement between attributes, then a block 220 is executed next. Otherwise, a block 225 is executed next.

In the block 220, the computer 105 may cause an HMI message to be displayed to a vehicle 101 operator concerning restrictions in implementing operator attributes. For example, if the module 106 is determined to move a steering wheel during a vehicle 101 operations even though the operator has requested that the steering will remain stationary, a message to this effect may be displayed. Following the block 220, the block 225 is executed.

In the block 225, which may follow either the block 215 or the block 220, the computer 105 may cause an HMI message to be displayed concerning actions to be implemented in vehicle 101 components. That is, such actions generally relate to positioning of components. For example, the computer 105 may cause to be listed components that will move as if the vehicle 101 was being manually operated and/or a list of components that will not move during autonomous vehicle 101 operations.

Following the block 225, the computer 105 determines whether to commence autonomous driving operations. For example, driver input to commence autonomous driving operations may be requested. If a driver indicates to start autonomous driving operations, then a block 235 is executed next. Otherwise, a block 255 is executed next.

In the block 235, the module 106 implements instructions for positioning a vehicle 101 component or components, such instructions having been determined or obtained as described above. For example, the module 106 could implement instructions to effect movement of a vehicle 101 steering wheel to mimic or approximate vehicle 101 steering conducted according to autonomous driving operations, e.g., according to instructions from the module 106. Alternatively, the module 106 could implement instructions such that a steering wheel is not moved regardless of steering conducted according to autonomous driving operations. As stated below, steps of processes disclosed herein could be implemented in different orders than specifically disclosed herein, and in particular that the block 235 could be implemented before or nearly simultaneously with the block 240.

In the block 240, which may follow the block 235, the vehicle 101 commences autonomous driving operations, i.e., begins driving in a manner partially or completely controlled by the autonomous driving module 106. For example, all vehicle 101 operations, e.g., steering, braking, speed, etc., could be controlled by the module 106 in the computer 105. However, it is also possible that, in the block 240, the vehicle 101 may be operated in a partially autonomous (i.e., partially manual, fashion, where some operations, e.g., braking, could be manually controlled by a driver, while other operations, e.g., steering, could be controlled by the computer 105.

Next, in a block 245, the module 106 determines whether to change any of the instructions implemented in the block 220 for positioning a vehicle 101 component or components. For example, a vehicle 101 operator could provide input via an HMI to change such instructions, data collectors 110 could detect a different vehicle 101 operator in a driver's seat, and the module 106 could determine that different instructions concerning positioning vehicle 101 components are appropriate for such different operator, or data collectors 110 could detect updated attributes concerning a vehicle 101 operator or driving conditions. In any event, if the module 106 determines that instructions for positioning vehicle 101 components should be altered, then the process 200 returns to the block 235 to implement any new position controls. Otherwise, the process 200 proceeds to a block 250.

In the block 250, the module 106 determines whether to continue autonomous driving operations. For example, operator input could be received ending autonomous driving operations, a vehicle 101 trip could end and the computer 105 could be powered off, etc. In any case, if the autonomous driving operations are to end, then the process 200 could end, or, as shown in FIG. 2, proceeds to the block 255. Otherwise, the process 200 returns to the block 240.

In the block 255, the computer 105 determines whether driving operations are to be continued. For example, user input could be received indicating that driving operations are to be terminated, a vehicle 101 could be powered off, etc. If driving operations are to be continued, then the process 200 returns to the block 205. Otherwise, the process 200 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer, the computer comprising a processor and a memory, the memory storing programming executable by the processor to:
   obtain data concerning at least one attribute of a vehicle operator;
   use the attribute to determine a plurality of respective modes for positioning each of a plurality of vehicle components during autonomous travel of the vehicle, each of the modes specifying, for each of the components, whether to move the vehicle component during the autonomous travel to mimic movement of the vehicle component as if the vehicle were being manually operated or not to move the component during the autonomous travel; and
   perform autonomous travel of the vehicle, including positioning the vehicle components according to the modes; wherein
   the vehicle components include at least one of a steering wheel, a brake pedal, and an accelerator pedal.

2. The system of claim 1, wherein the data is at least one of data received concerning a vehicle operator, and operator input.

3. The system of claim 1, wherein the computer is further configured to allow at least one second component in the vehicle to operate under manual control.

4. A method, comprising:
   obtaining data concerning at least one attribute of a vehicle operator;
   using the attribute to determine a plurality of respective modes for positioning each of a plurality of vehicle components during autonomous travel of the vehicle, each of the modes specifying, for each of the components, whether to move the vehicle component during the autonomous travel to mimic movement of the vehicle component as if the vehicle were being manually operated or not to move the component during the autonomous travel; and
   performing autonomous travel of the vehicle, including positioning the vehicle components according to the modes; wherein
   the vehicle components include at least one of a steering wheel, a brake pedal, and an accelerator pedal.

5. The method of claim 4, wherein the data is at least one of data received concerning a vehicle operator, and operator input.

6. The method of claim 4, further comprising allowing at least one second component in the vehicle to operate under manual control.

7. A computer-readable medium having tangibly embodied thereon instructions executable by a computer processor, the instructions comprising instructions for:
   obtaining data concerning at least one attribute of a vehicle operator;
   using the attribute to determine a plurality of respective modes for positioning each of a plurality of vehicle components during autonomous travel of the vehicle, each of the modes specifying, for each of the components, whether to move the vehicle component during the autonomous travel to mimic movement of the vehicle component as if the vehicle were being manually operated or not to move the component during the autonomous travel; and
   performing autonomous travel of the vehicle, including positioning the vehicle components according to the modes; wherein
   the vehicle components include at least one of a steering wheel, a brake pedal, and an accelerator pedal.

8. The medium of claim 7, wherein the data is at least one of data received concerning a vehicle operator, and operator input.

9. The medium of claim 7, further comprising allowing at least one second component in the vehicle to operate under manual control.

10. The system of claim 1, wherein the attribute includes at least one of a driver level of experience with autonomous vehicle operation and an estimated driver age.

11. The method of claim 4, wherein the attribute includes at least one of a driver level of experience with autonomous vehicle operation and an estimated driver age.

12. The method of claim 7, wherein the attribute includes at least one of a driver level of experience with autonomous vehicle operation and an estimated driver age.

13. The method of claim 1, wherein the at least one attribute includes both at least one operator preference and at least one factual characteristic of the operator.

14. The method of claim 13, wherein the memory further stores programming executable by the processor to:
   determine whether the operator preference and the factual characteristic agree; and
   in the absence of agreement, give priority to the factual characteristic over the operator preference as the determining attribute.

15. The method of claim 4, wherein the at least one attribute includes both at least one operator preference and at least one factual characteristic of the operator.

16. The method of claim 15, further comprising:
   determining whether the operator preference and the factual characteristic agree; and
   in the absence of agreement, giving priority to the factual characteristic over the operator preference as the determining attribute.

17. The method of claim 7, wherein the at least one attribute includes both at least one operator preference and at least one factual characteristic of the operator.

18. The method of claim 17, the instructions further comprising instructions for:
   determining whether the operator preference and the factual characteristic agree; and in the absence of agreement, giving priority to the factual characteristic over the operator preference as the determining attribute.

* * * * *